(12) United States Patent
Radek et al.

(10) Patent No.: US 6,604,867 B2
(45) Date of Patent: Aug. 12, 2003

(54) FIBER OPTIC CONNECTOR

(75) Inventors: Jeffrey J. Radek, Romeoville, IL (US); Phillip J. Irwin, Tinley Park, IL (US)

(73) Assignee: Panduit Corp., Tinley Park, IL (US)

( * ) Notice: Subject to any disclaimer, the term of this patent is extended or adjusted under 35 U.S.C. 154(b) by 106 days.

(21) Appl. No.: 10/014,915

(22) Filed: Oct. 23, 2001

(65) Prior Publication Data

US 2003/0077048 A1 Apr. 24, 2003

(51) Int. Cl.[7] .................................................. G02B 6/36
(52) U.S. Cl. ........................................................ 385/81
(58) Field of Search .............................. 385/60, 62, 66, 385/70, 72, 76, 77, 78, 81, 85, 139

(56) References Cited

U.S. PATENT DOCUMENTS

| | | |
|---|---|---|
| 4,101,198 A | 7/1978 | Heldt |
| 4,627,469 A | 12/1986 | Buard |
| 4,810,053 A | 3/1989 | Woith |
| 5,159,655 A | 10/1992 | Ziebol et al. |
| 5,179,608 A * | 1/1993 | Ziebol et al. ................. 385/81 |
| 5,394,496 A * | 2/1995 | Caldwell et al. .............. 385/70 |
| 5,857,045 A * | 1/1999 | Lee ............................. 385/70 |
| 6,018,606 A | 1/2000 | Sogabe et al. |
| 6,022,150 A * | 2/2000 | Erdman et al. ............... 385/81 |
| 6,035,090 A | 3/2000 | Kawaguchi et al. |
| 6,173,097 B1 | 1/2001 | Throckmorton et al. |
| 6,179,482 B1 | 1/2001 | Takizawa et al. |
| 6,196,731 B1 | 3/2001 | Carlisle et al. |
| 6,234,685 B1 | 5/2001 | Carlisle et al. |
| 6,259,856 B1 | 7/2001 | Shahid |
| 6,282,348 B1 | 8/2001 | Carlisle et al. |

FOREIGN PATENT DOCUMENTS

| | | |
|---|---|---|
| EP | 1052532 A2 | 11/2000 |
| EP | 0149377 B1 | 3/2001 |

* cited by examiner

Primary Examiner—Neil Abrams
Assistant Examiner—Thanh-Tam Le
(74) Attorney, Agent, or Firm—Robert A. McCann; Jay A. Saltzman; Christopher S. Clancy

(57) ABSTRACT

A fiber optic connector for terminating an optical fiber, the connector comprising a housing having opposed first and second ends, the housing receiving the optical fiber at the first end thereof, an elongated member retainable in the housing and extending generally from one of the opposed ends to the other of the opposed ends, the elongated member including a ferrule holding portion proximate the second end of the housing and a crimpable portion distinct from the ferrule holding portion, the crimpable portion being generally aligned with the ferrule holding portion and being closer to the first end of the housing than is the ferrule holding portion, a ferrule disposable within the ferrule holding portion of the elongated member, the ferrule including an aperture running therethrough and being generally aligned with the crimpable portion when the ferrule is disposed within the ferrule holding portion, the ferrule including a polished front face, at least one crimp supporting member disposable within the crimpable portion of the elongated member, the at least one crimp supporting member defining an elongated path through the crimpable portion, the path being generally aligned with the aperture of the ferrule, and a stub fiber having opposing ends, the stub fiber being disposed within the aperture of the ferrule, one end of the stub fiber being generally aligned with the polished front face of the ferrule and the opposite end of the stub fiber being disposed within the ferrule.

11 Claims, 8 Drawing Sheets

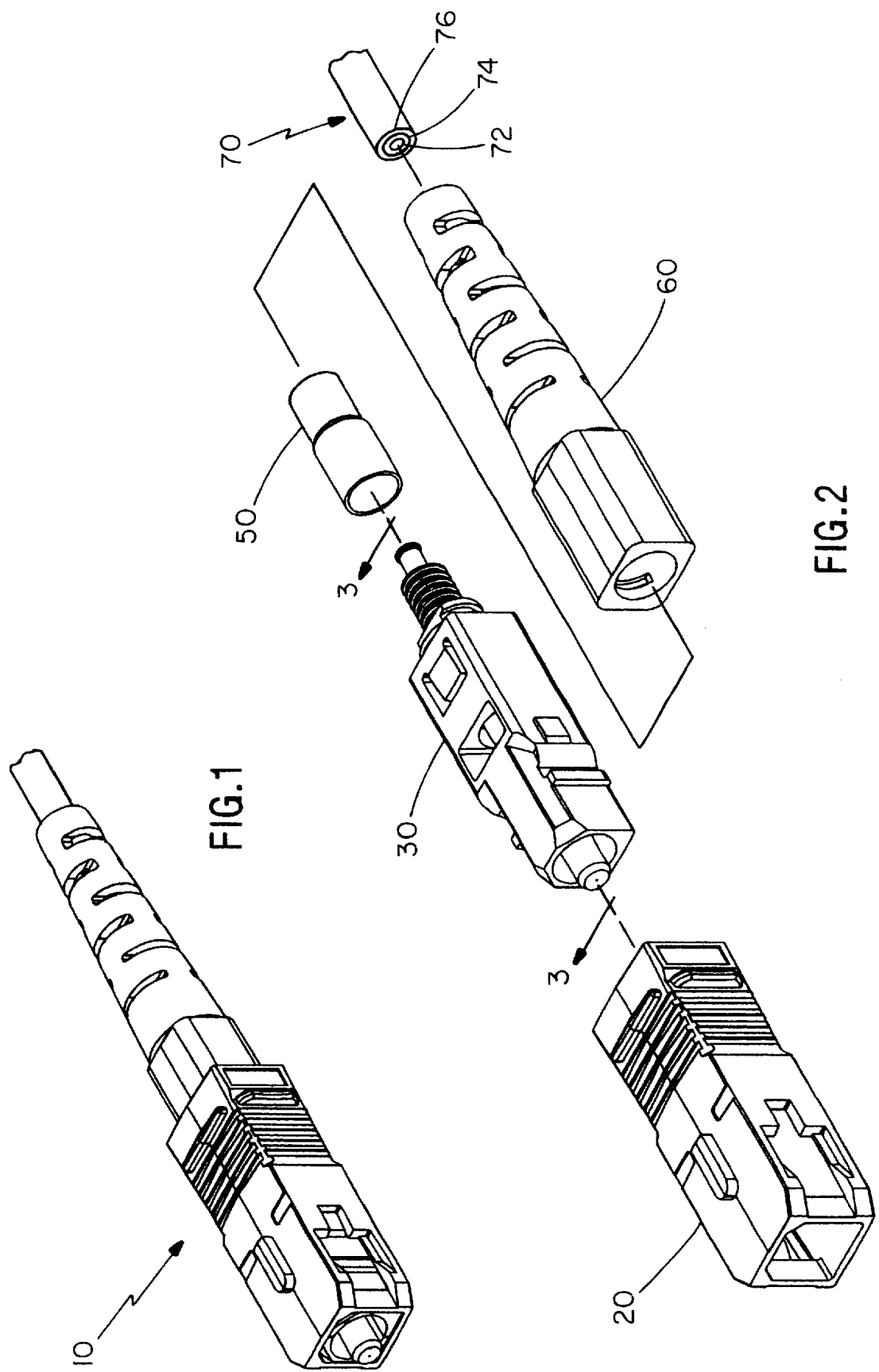

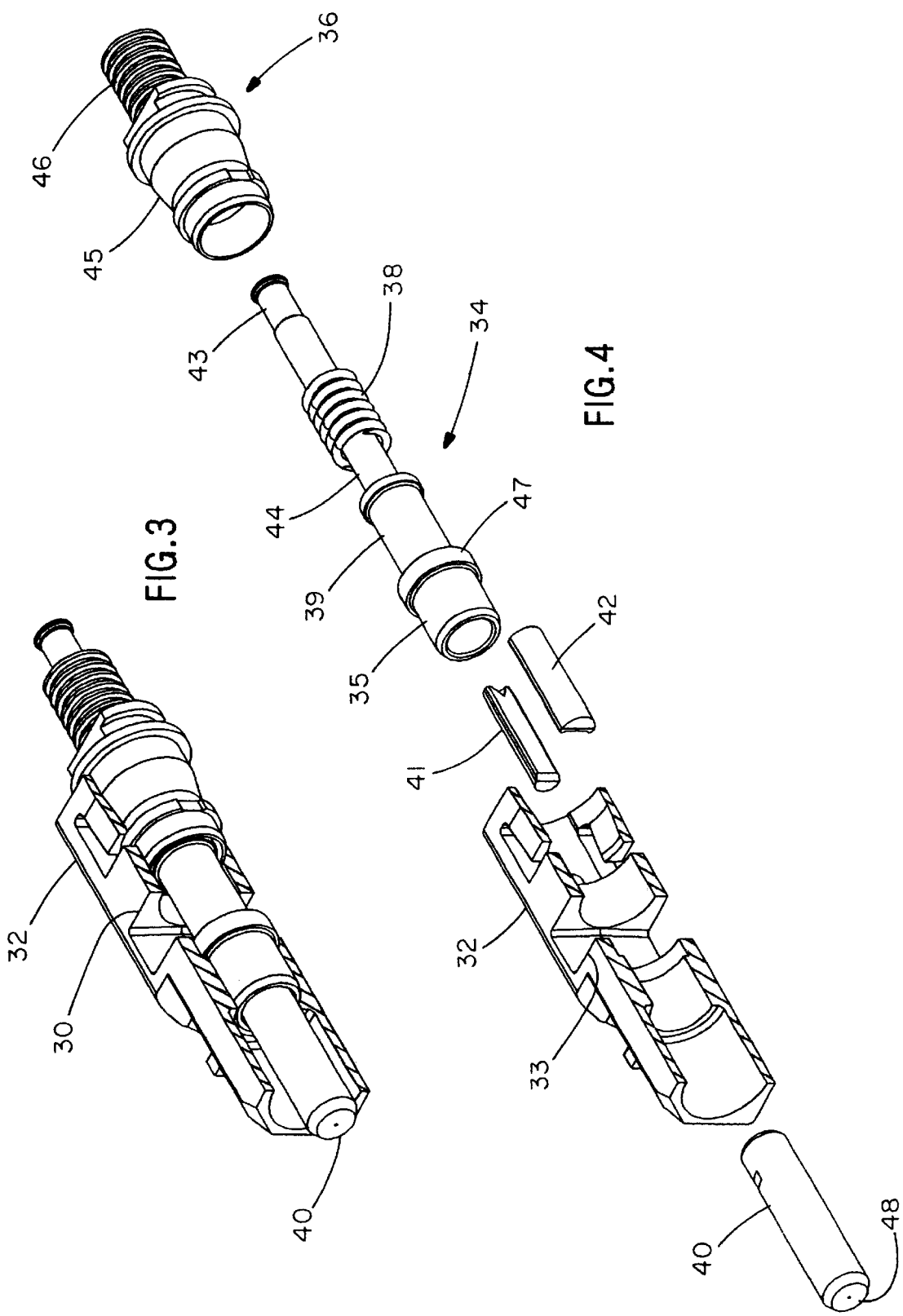

FIBER OPTIC CONNECTOR

BACKGROUND OF THE INVENTION

As telecommunications applications continue to proliferate, there is an increasing need for higher quality and easier to apply connectors for fiber optic transmission lines.

One known type of fiber optic connector is the "pigtail" type connector wherein a premanufactured connector includes a cylindrical ceramic ferrule having a highly polished front face, a fiber stub adhered within an axial aperture in the ferrule, wherein the fiber stub extends rearwardly beyond, and thereby protrudes from, a rear end of the ferrule. In the field, the pigtail-type connector is applied, in part, by inserting the pigtail fiber stub end into other connector apparatus wherein it comes flush with the stripped end of the field fiber to which it is being connected. Although the interfacing ends of the stub and field fibers may be precision cleaved, the stub fiber may have its end damaged prior to interfacing the fiber stub because it may be exposed to damaging elements in its pigtailed state. If the pigtailed end of the stub fiber is nicked or otherwise damaged, the interface with the field fiber will not be of the highest quality and signal transfer from one fiber to the other may be compromised at the interface. Thus, there is a need for maintaining the unpolished end of the stub fiber in as pristine a condition as possible.

The fiber optic connectors generally at issue here are manufactured in mass by control processes; thus, there is always a desire to enhance the speed, ease, and cost with which such connectors are assembled. In some known fiber optic connectors, crimp support materials must be inserted into a crimping space very accurately, especially with regard to angular position due to the need for ribs or flanges extending therefrom to protrude through portions of a circumscribing crimp sleeve, such as is the case in the connector disclosed in U.S. Pat. No. 6,234,685. As controlling the angular position of the crimp support materials yields increased cost in the manufacturing process, it would be considered desirable to remove this step from the manufacturing process.

SUMMARY OF THE INVENTION

In at least one form, the invention may include a fiber optic connector for terminating an optical fiber, the connector comprising a housing having opposed first and second ends, the housing receiving the optical fiber at the first end thereof, an elongated member retainable in the housing and extending generally from one of the opposed ends to the other of the opposed ends, the elongated member including a ferrule holding portion proximate the second end of the housing and a crimpable portion distinct from the ferrule holding portion, the crimpable portion being generally aligned with the ferrule holding portion and being closer to the first end of the housing than is the ferrule holding portion, a ferrule disposable within the ferrule holding portion of the elongated member, the ferrule including an aperture running therethrough and being generally aligned with the crimpable portion when the ferrule is disposed within the ferrule holding portion, the ferrule including a polished front face, at least one crimp supporting member disposable within the crimpable portion of the elongated member, the at least one crimp supporting member defining an elongated path through the crimpable portion, the path being generally aligned with the aperture of the ferrule, and a stub fiber having opposing ends, the stub fiber being disposed within the central aperture of the ferrule, one end of the stub fiber being generally aligned with the polished front face of the ferrule and the opposite end of the stub fiber being disposed within the ferrule.

In at least another form, the invention may include a crimpable fiber optic connector for terminating an optical fiber, the connector being crimpable by a crimp die, the connector comprising a housing having a window, the housing receiving the optical fiber at the first end thereof an elongated member retainable in the housing, the elongated member including a crimpable portion, the crimpable portion being disposed within the housing such that it is accessible through the window of the housing by the crimp die, and at least one crimp supporting member disposable within the crimpable portion of the elongated member, the at least one crimp supporting member defining an elongated path for the optical fiber through the crimpable portion, the crimp die including a pair of generally opposed crimping implements translatable generally toward and away from each other, at least one of the crimping implements having a pair of extending triangular portions at opposite ends thereof, each of the projections for contacting the crimpable portion of the elongated member when the crimp die is applied to the connector.

In at least another form, the invention may include a method for assembling a fiber optic connector, the method comprising the steps of providing a housing having opposed first and second ends providing an elongated member including a ferrule holding portion at one end thereof and a crimpable portion distinct from the ferrule holding portion, the crimpable portion being generally aligned with the ferrule holding portion, providing at least one crimp supporting member, providing a ferrule having a front end and a rear end, the ferrule including a narrow aperture extending from one end to the other, providing a stub fiber having a length dimension shorter than that of the ferrule aperture and a width dimension sufficiently small to permit the stub fiber to be inserted into the ferrule aperture, inserting the stub fiber into the ferrule aperture such that one end of the stub fiber is generally even with the front end of the ferrule and the other end is within, and not extending beyond, the ferrule aperture, affixing the stub fiber within the ferrule aperture, polishing the front end of the ferrule aperture, inserting the crimp supporting member through the ferrule holding portion and into the crimpable portion of the elongated member, inserting the ferrule at least partially into the ferrule holding portion of the elongated member, affixing the ferrule at least partially within the ferrule holding portion of the elongated member so as to retain the crimp supporting member within the crimpable portion of the elongated member, inserting the elongated member into the housing, and affixing the elongated member within the housing.

In at least another form, the invention may include a method for terminating a multiply layered field optical fiber having a glass fiber core with an optical fiber connector including a housing having opposed first and second ends and a window, an elongated member retainable in the housing and extending generally from one of the opposed ends to the other of the opposed ends, the elongated member including a ferrule holding portion proximate the second end of the housing and a crimpable portion distinct from the ferrule holding portion, the crimpable portion being generally aligned with the ferrule holding portion and being closer to the first end of the housing than is the ferrule holding portion, a ferrule disposable within the ferrule holding portion of the elongated member, the ferrule including an aperture running therethrough and being generally aligned with the crimpable portion when the ferrule is disposed within the ferrule holding portion, the ferrule including a polished front face, at least one crimp supporting member disposed within the crimpable portion of the elongated member, the at least one crimp supporting member defining an elongated path through the crimpable portion, the path being generally aligned with the aperture of the ferrule, and a stub fiber having opposing ends, the stub fiber being disposed within the aperture of the ferrule, one end of the stub fiber being generally even with the polished front face of the ferrule and the opposite end of the stub fiber being disposed within the ferrule, the method comprising the steps of providing a crimp tool having opposed crimp dies thereon stripping at least one layer from the field optical fiber to expose the glass fiber core, placing the connector on at least one of the crimp dies of the crimp tool, lightly closing the opposable crimp dies of the crimp tool over the connector such that at least one of the crimp dies protrudes through the housing window to contact the crimpable portion of the elongated member and simultaneously retain the connector on the crimp tool, inserting the glass fiber core through the end of the extending member closer the first end of the housing, into and through the elongated path in the crimpable portion of the extending member defined by the crimp supporting member, into the aperture of the ferrule and into contact with the stub fiber disposed within the ferrule aperture, and forcefully closing the opposable crimp dies of the crimp tool over the connector so as to crimp the crimpable portion of the elongated member and thereby retain the field fiber in contact with the stub fiber within the ferrule aperture.

BRIEF DESCRIPTION OF FIGURES

FIG. 1 shows a completely assembled connector in accordance with a preferred embodiment of the invention;

FIG. 2 shows an exploded view of the connector of FIG. 1;

FIG. 3 shows an assembled inner housing assembly of the connector of FIG. 1 with the inner housing broken to facilitate viewing inner components;

FIG. 4 shows an exploded view of the inner housing assembly of FIG. 3;

DETAILED DESCRIPTION OF PREFERRED EMBODIMENTS

Figure 5:
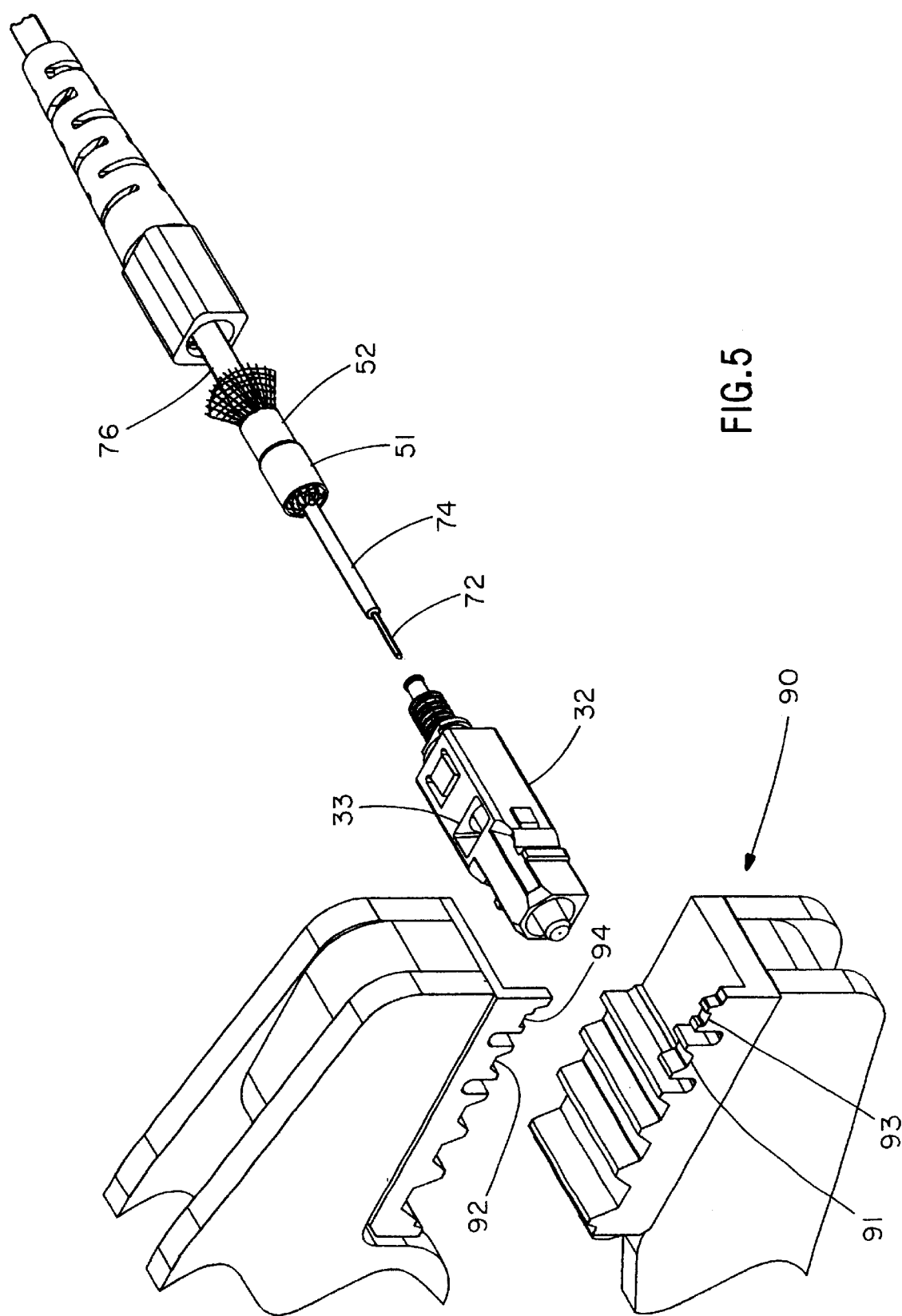
FIG. 5 shows an exploded, diagrammatic view of the connector of FIG. 1 being applied to a field fiber.

The illustrated embodiment of the invention is directed to an SC-style fiber optic termination/connector for facilitating the termination/connection of an optical fiber found in the field (field fiber) to an optical fiber predisposed in the connector (stub fiber), and then ultimately to another field fiber or device, such that a fiber optic signal (light) may be passed from one fiber to the other with minimal signal degradation occurring at the connection/interface between the fibers.

FIG. 1 shows a completely assembled SC-style fiber optic connector 10 and FIG. 2 shows an exploded view of the same. As can be seen therein, in a preferred embodiment, the connector 10 includes an outer housing 20, an inner housing assembly 30, a crimp sleeve 50, and a boot 60. The connector is applied to a fiber optic cable 70, such as the one shown in cross section in FIG. 2. As also seen in FIGS. 3, 4, 7, 9, and 11, the inner housing assembly 30 includes a plastic inner housing 32 encircling an elongated, metallic, and sectionally tubular backbone 34, a helical spring 38, a cylindrical, polished ceramic ferrule 40, and top 41 and bottom 42 locking pads or planks.

Figure 11:
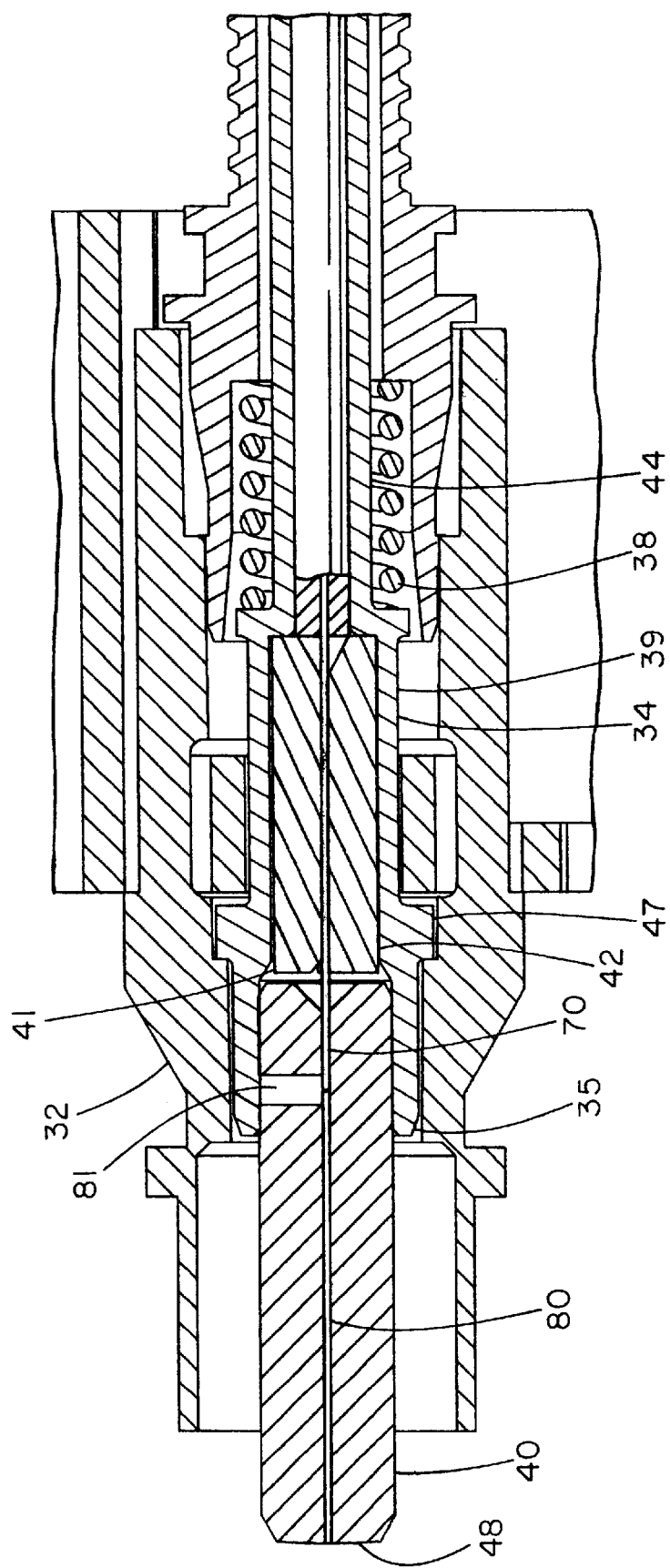
FIG. 11 shows a cross-sectional view of the connector of FIG. 1 in a crimping die during compression of the die; taken along the line 11—11 in FIG. 9.

In particular, as probably best seen in exploded FIG. 4 and assembled FIGS. 3 and 11, the backbone 34 has the helical spring 38 preferably disposed about a body portion 44 thereof, top and bottom planks 41 and 42, respectively, are cooperatively inserted through the ferrule holding end 35 of the backbone 34 and into the glass crimping section 39 thereof. The ceramic ferrule 40 is then inserted at least partly into the ferrule holding end 35 where it is maintained by interference fit friction, thereby securing the inserted planks 41 and 42 within the glass crimp section 39. Alternatively, the ferrule 40 could be held in the ferrule holding end 35 by an adhesive. The assemblage of backbone, planks, ferrule, and spring is then inserted into the inner housing 32, after which the front portion 45 of a corrugated endcap 36 is inserted into the rear of the inner housing 32 against the bias of the spring 38 until it snaps into place, thereby keeping the backbone 34 pressed as far forward as the projecting ring 47 thereof will permit it to travel until it comes flush with an interior portion of the inner housing 32. The endcap 36 fits over primarily the body portion 44 of the backbone so that the buffer crimp portion 43 extends through the rear corrugated portion 46 of the endcap 36. Although the illustrated embodiment shows the backbone 34 and the component sections thereof being circular/cylindrical, they, and any later-described cooperating structure alternatively could be square/prismatic or otherwise shaped.

The ceramic ferrule 40 has a highly polished front face 48 intended for terminating/connecting the stub fiber 80 running partly therethrough in a highly smooth and aligned fashion so as to avoid signal degradation as it passes from the stub fiber 80 to another connecting fiber or device. Though the stub fiber 80 may be adhered within the axial aperture of the ferrule 40 in a number of ways, in a preferred embodiment the stub fiber 80 is inserted through the aperture from the rear until it protrudes somewhat beyond the front face 48. Adhesive is then applied to the exterior portion of the stub fiber protruding from the ferrule so that when the fiber is then pushed back into the aperture, the adhesive can affix the fiber therein. Any fiber still protruding may be severed thereafter, such as when the front face is subsequently polished.

The stub fiber 80 extends axially within the ferrule 40 from the front face 48 thereof to a point generally within an index matching gel site 81 on the rear half of the ferrule 40. Index matching gel is inserted at this site to minimize signal loss at the interface between the stub and field fibers by approximating the refractive index of the glass rather than permitting the relatively disparate refractive index of ambient air to fill any small gaps at the interface. The inner housing assembly is generally preassembled at the factory so that the assembly is ready for use in the field. Unlike some known "pigtail" type connectors, the rear end of the stub fiber does not extend beyond the rear face of the ferrule 40, and, because it is not thusly exposed to potential damage in the field, it may be precision cleaved in the factory and remain unexposed and relatively undamaged prior to use in the field.

Figure 8:
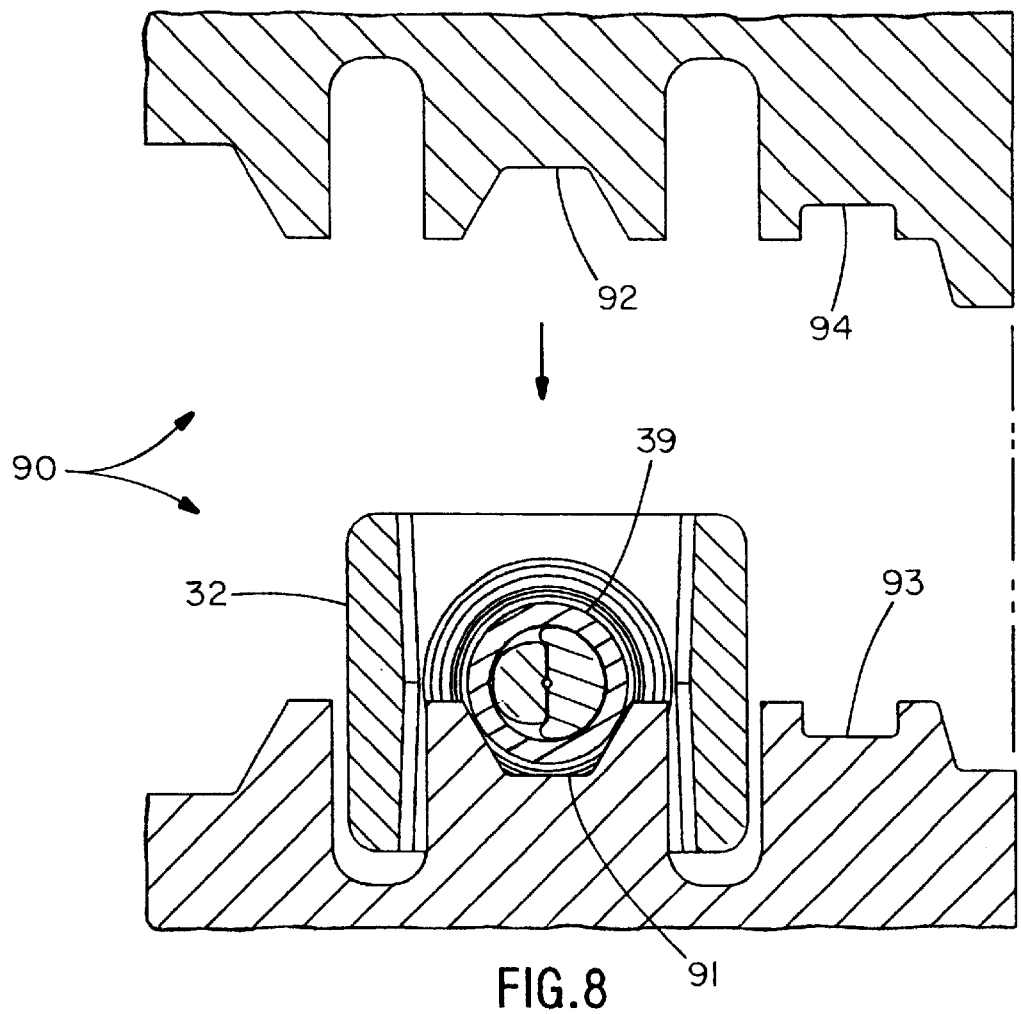
FIG. 8 shows a cross-sectional view of the connector of FIG. 1 in a crimping die prior to compression of the die, taken along the line 8—8 in FIG. 7.
Figure 10:
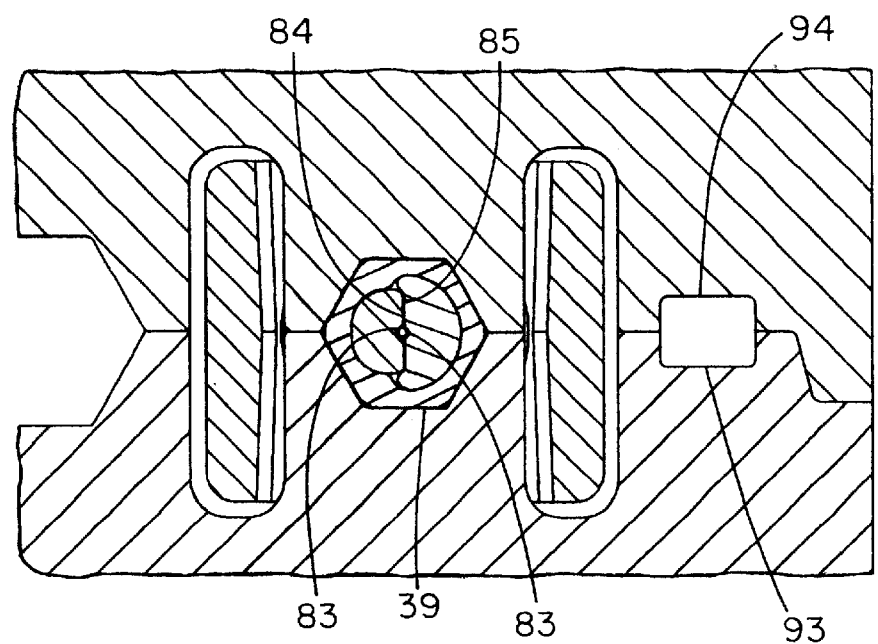
FIG. 10 shows a cross-sectional view of the connector of FIG. 1 in a crimping die during compression of the die, taken along the line 10—10 in FIG. 9.

Top plank 41 and bottom plank 42, as seen in perspective in FIG. 4 and in cross-section in FIGS. 8 and 10, include tapered lead-ins 82 at the rear ends thereof to facilitate the field fiber 70 being inserted therebetween from the rear. One or both of the planks include groove portions 83 along the respective engagement surfaces thereof, 84 and 85, to permit the glass fiber 72 to pass therebetween along the longitudinal length of the planks and to align with the rear entry to the aperture of the ceramic ferrule 40. The ceramic ferrule 40 may also preferably include a tapered lead-in portion 86 at the rear end thereof to facilitate entry of the glass fiber 72. Such a lead-in 86 may take the form of a generally conical cut-away portion of the ferrule.

Top and bottom planks 41 and 42 are generally complementary at their respective engagement surfaces, 84 and 85, respectively, and each has a generally arcuate non-engagement surface, which, when the planks are engaged, together form a somewhat circular perimeter for fitting relatively snugly within the round glass crimp section 39 of the backbone 34. The planks, despite their labels as "top" and "bottom" need not be inserted into the crimp section 39 in any particular angular orientation relative to the fiber (and FIGS. 8 and 10 actually show them side-by-side). This 360 degree insertion feature of particular embodiments of the invention provides advantages relative to certain angularly fixed status quo connectors having ribs or flanges protruding through portions of a crimp sleeve, such as is the case in the connector disclosed in U.S. Pat. No. 6,234,685, for example.

In the field, prior to insertion into the connector, the field fiber 70 is prepared by appropriately stripping the insulative layer(s) and any stiffening layer(s) off the end of the field fiber. The layers may typically include, for example, a jacket 76, such as insulative rubber or plastic, and a buffer 74 made of insulative rubber or plastic. An intermediate strengthening layer 75, such as Kevlar®, may preferably circumferentially reside between the buffer and jacket. The jacket (and strengthening layer) may be pulled back over the unstripped portion of the field fiber 70 and held generally externally adjacent thereto by the crimp sleeve 50 which may be slid thereover (shown in FIGS. 5 and 6). The now exposed glass fiber 72 is precision cleaved to an appropriate length.

Figure 6:
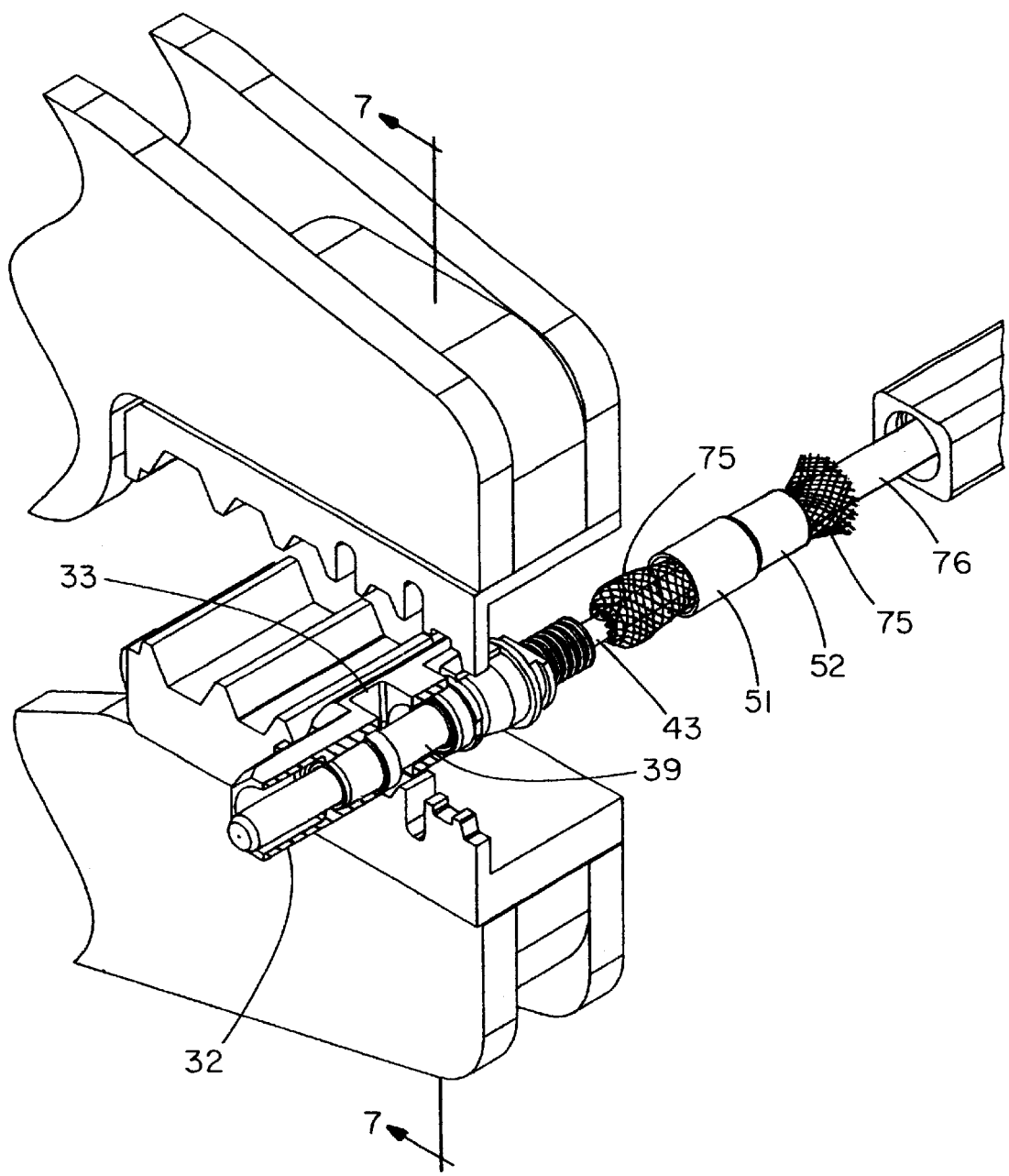
FIG. 6 shows an exploded, diagrammatic view of the connector of FIG. 1 being disposed in a crimping die in preparation for a glass crimping step.
Figure 7:
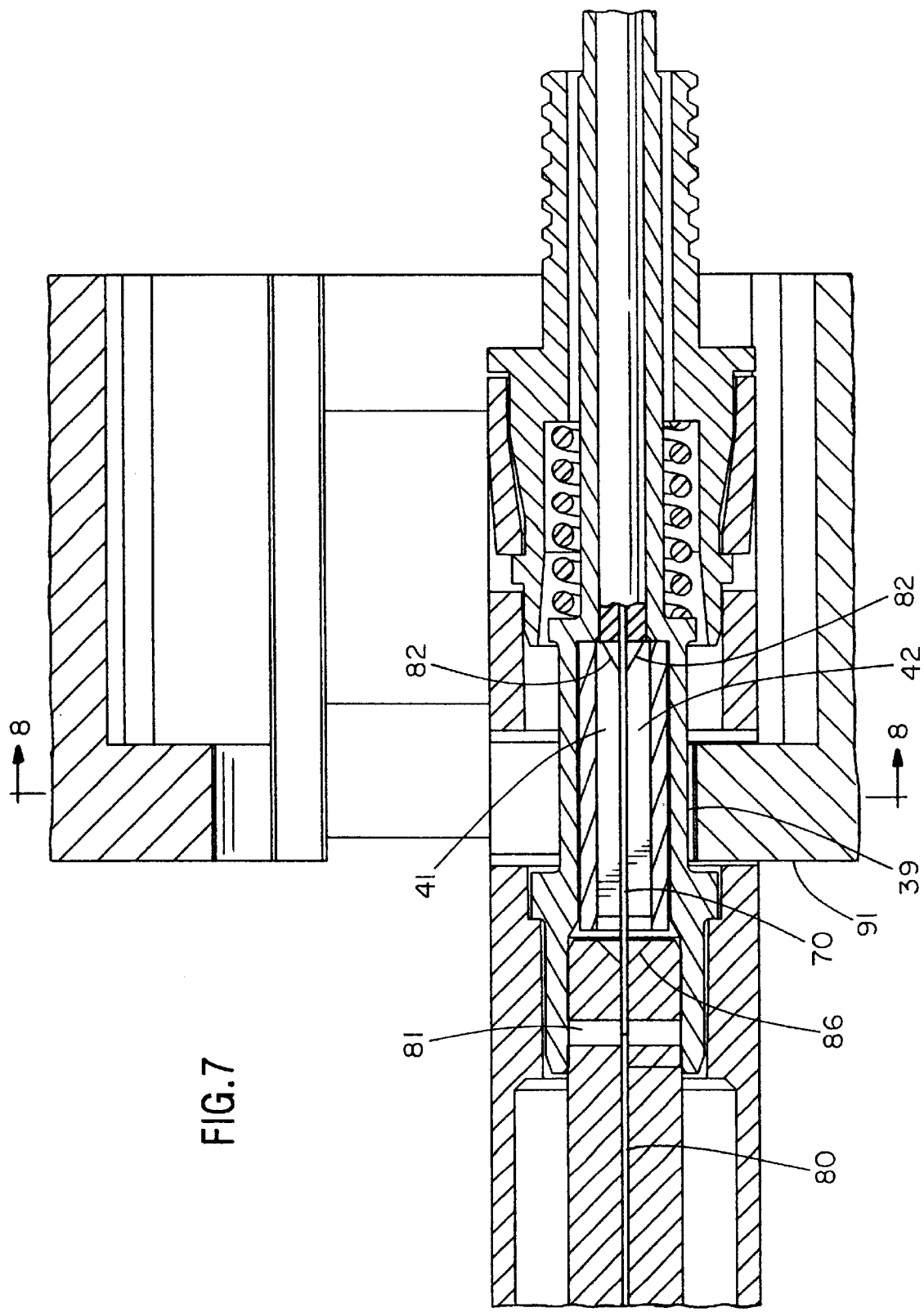
FIG. 7 shows a cross-sectional view of the connector of FIG. 1 in a crimping die prior to compression of the die, taken along the line 7—7 in FIG. 6.

Once the inner housing assembly 30 is fully assembled, it is placed onto a lower glass crimping die 91 of the crimping tool 90, as shown in perspective in FIGS. 5 and 6 and in cross section in FIG. 7. Specifically, in the shown embodiment (FIGS. 7 and 8), the assembly 30 is placed so that the lower glass crimping die 91 protrudes into the assembly through crimping window 33 of the inner housing 32. At this point, the crimping tool 90 may be closed with very light pressure to simply hold the assembly 30 in place on the die 91. When the tool closes, the upper glass crimping die 92 penetrates a crimp window 33 in the upper portion of the inner housing 32 to secure the assembly in place on the die.

After the inner housing assembly 32 is fully assembled and properly disposed on the crimping tool 90, the cleaved end of the field fiber is then inserted through the buffer crimp portion 43 of the backbone 34. The cleaved end travels through the backbone 34, between the top and bottom planks 41 and 42, respectively, therein, before entering the rear of the ferrule 40 and coming into aligned contact with the suitably precision cleaned and/or polished stub fiber 80 within the narrow axial aperture of the ferrule 40.

Figure 9:
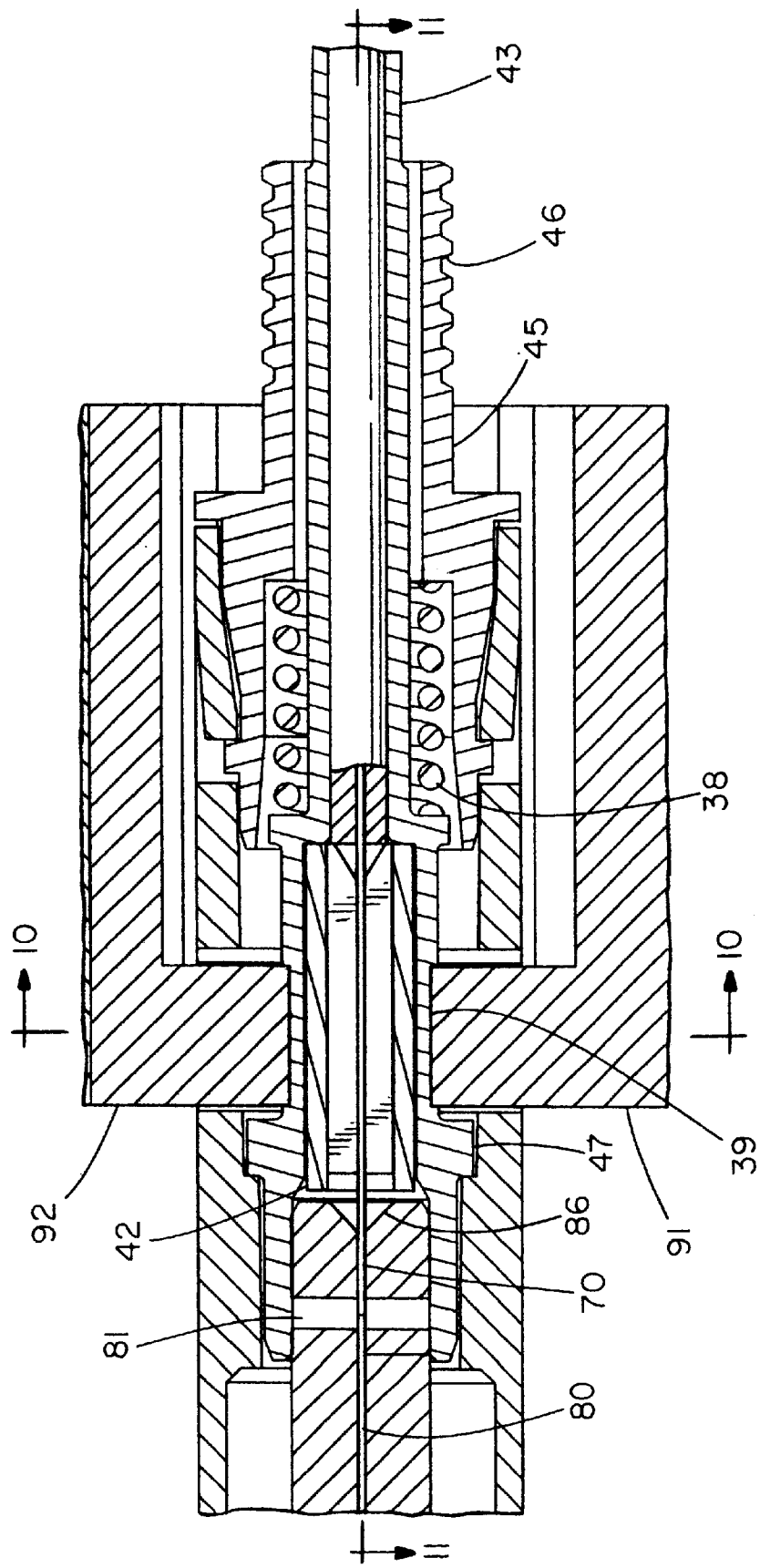
FIG. 9 shows a cross-sectional view of the connector of FIG. 1 in a crimping die during compression of the die, taken along the line 7—7 in FIG. 6 after the die is compressed.

Once the field fiber 70 is fully inserted into the inner housing assembly 30 so that it comes flush with the stub fiber 80 within the ceramic ferrule 40, the crimping tool is then compressed more forcibly so that the preferably complementary upper glass crimping die 92 of the tool 90 compresses the glass crimp section 39 of the backbone 34 about the top and bottom planks, 41 and 42, respectively, carried therein (shown in FIGS. 9, 10 and 11). The lower and upper glass crimping dies 91 and 92 may protrude through a common window extending at least partially around the inner housing or may protrude through separate crimp windows. In this manner, the crimp planks 41 and 42 are pressed against each other at their engagement surfaces, and within the groove on one or both planks, the glass fiber 72 is held securely therein at the point of crimping. Unlike in some known connectors wherein crimping occurs at the general location of the interface between the stub fiber and the field fiber, crimping in some of the preferred embodiments of the invention occurs at the location of the planks in the glass crimping section of the backbone, rather than near the interface of the stub and field fibers, which is in the index matching gel site within the ferrule.

In a preferred embodiment, the lower and upper dies, 91 and 92, of the glass crimping die are generally semi-hexagonal in shape and protrude into the inner housing (through one or more crimping windows therein) in at least two places. The hexagonal shape formed in certain preferred embodiments of the invention in the glass crimping die by the compression of the crimping tool 90 is considered particularly useful in that it provides nearly uniform crimping pressure about the glass crimping section of the backbone regardless how the planks are angularly oriented therein relative thereto. Also the hexagonal shape permits a pair of penetrating points from each die to penetrate the single or multiple crimp windows in the inner housing, providing favorable angular distribution of the crimping forces through the crimp window(s).

After the glass crimping step has been performed, a buffer crimp is preferably performed on the buffer crimp portion 43. The buffer crimp secures the buffered portion of the field fiber 70, at the point where the jacket 76 is stripped away, to the backbone 43 of the inner housing assembly. This buffer crimp fixes a second point along the length of the field fiber and significantly limits the threat of stress applied to the field fiber 70 beyond the buffer crimp point from being transferred along the length of the glass fiber 72 to the glass crimp, or even beyond to the precision cleaved interface between the glass fiber 72 and the stub fiber 80 within the ferrule 40. The geometry for the buffer crimp is not limited by the invention and it may take any known form. Also, the crimp dies 93 and 94 for performing the buffer crimp may be disposed on the same crimp tool 90 as are the glass crimp dies 91 and 92, as is shown in the illustrated embodiment in FIGS. 5, 6, 8, and 10. Alternatively, separate dies and/or tools may be used for the different crimps. The illustrated combined arrangement may facilitate the installation of the connectors since the installer does not then need to change tools as often or at all.

Additional crimps, such as those securing the jacket or strengthening layer, may also be performed to strengthen the connection of the field fiber to the inner housing assembly and/or limit stress transference along the fiber.

For example, after the buffer crimping step has been performed, the strength layer 75 is pulled forward over the corrugated rear portion 46 of the corrugated endcap 36 of the inner housing assembly. The crimp sleeve 50 may then be pulled forward over the strengthening layer 75 and the corrugated rear portion 46. The front portion 51 of the crimp sleeve 50 is then crimped. This crimp limits the stress to both the buffer 74 and glass fiber 72. A jacket crimping step may also be performed. The jacket crimp secures the rear portion 52 of the crimp sleeve 50 to the cable jacket 76 to prevent the strengthening layer 75 and buffer 74 from being exposed.

After the crimps have been performed, the now-assembled inner housing assembly 30 may than be latchably inserted into the outer housing 20. A rubber or plastic boot 60 may preferably be overwrapped about the crimp sleeve 50, the corrugated endcap 36, and/or the nearby jacketed field fiber 70, so that the boot comes generally flush with the outer housing 20. In this manner the boot may provide for easier handling of the connector and cleaner appearance.

The disclosed invention provides an improved fiber optic connector. It should be noted that the above-described and illustrated embodiments and preferred embodiments of the invention are not an exhaustive listing of the forms such a connector in accordance with the invention might take; rather, they serve as exemplary and illustrative of embodiments of the invention as presently understood. By way of example, and without limitation, a non-SC-style fiber.optic connector, such as an FJ or ST-style connector, is contemplated to be within the scope of the invention. Similarly, though the illustrated embodiment is directed toward a multimode cable connection, a single mode connection is also contemplated by the invention. Many other forms of the invention are believed to exist.

What is claimed is:

1. A fiber optic connector for terminating an optical fiber, said connector comprising:
    a housing having opposed first and second ends, said housing receiving said optical fiber at said first end thereof;
    an elongated member retainable in said housing and extending generally from one of said opposed ends to the other of said opposed ends, said elongated member including a ferrule holding portion proximate said second end of said housing and a crimpable portion distinct from said ferrule holding portion, said crimpable portion being generally aligned with said ferrule holding portion and being closer to said first end of said housing than is said ferrule holding portion;
    a ferrule disposable within said ferrule holding portion of said elongated member, said ferrule including an aperture running therethrough and being generally aligned with said crimpable portion when said ferrule is disposed within said ferrule holding portion, said ferrule including a polished front face;
    at least one crimp supporting member disposable within said crimpable portion of said elongated member, said at least one crimp supporting member defining an elongated path through said crimpable portion, said path being generally aligned with said aperture of said ferrule; and
    a stub fiber having opposing ends, said stub fiber being disposed within said central aperture of said ferrule, one end of said stub fiber being generally aligned with said polished front face of said ferrule and the opposite end of said stub fiber being disposed within said ferrule.

2. A fiber optic connector in accordance with claim 1 wherein said housing includes at least one crimp window generally disposed proximate said crimpable portion of said elongated member retainable in said housing, said crimp window being penetrable by a crimp die to compressibly contact said crimpable portion of said elongated member while within said housing.

3. A fiber optic connector in accordance with claim 1 wherein said connector further comprises:
    a crimp sleeve crimped over at least a portion of said optical fiber and at least a portion of said first end of said housing.

4. A fiber optic connector in accordance with claim 1 wherein said at least one crimp supporting member is insertable into said crimpable portion at any angular orientation relative to said elongated path.

5. A crimpable fiber optic connector for terminating an optical fiber, said connector being crimpable by a crimp die, said connector comprising:
    a housing having a window, said housing receiving said optical fiber at said first end thereof;
    an elongated member retainable in said housing, said elongated member including a crimpable portion, said crimpable portion being disposed within said housing such that it is accessible through said window of said housing by said crimp die; and
    at least one crimp supporting member disposable within said crimpable portion of said elongated member, said at least one crimp supporting member defining an elongated path for said optical fiber through said crimpable portion;
    said crimp die including a pair of generally opposed crimping implements translatable generally toward and away from each other, at least one-of said crimping implements having a pair of extending triangular portions at opposite ends thereof, each of said projections for contacting said crimpable portion of said elongated member when said crimp die is applied to said connector.

6. A crimpable fiber optic connector in accordance with claim 5 wherein at least one of said pair of generally opposed crimping implements is semi-hexagonal in shape.

7. A crimpable fiber optic connector in accordance with claim 6 wherein both of said pair of generally opposed crimping implements is semi-hexagonal in shape.

8. A crimpable fiber optic connector in accordance with claim 7 wherein said at least one crimp supporting member is insertable into said crimpable portion at any angular orientation relative to said elongated path.

9. A crimpable fiber optic connector in accordance with claim 5 wherein said at least one crimp supporting member is insertable into said crimpable portion at any angular orientation relative to said elongated path.

10. A method for assembling a fiber optic connector, said method comprising the steps of:
    providing a housing having opposed first and second ends;
    providing an elongated member including a ferrule holding portion at one end thereof and a crimpable portion distinct from said ferrule holding portion, said crimpable portion being generally aligned with said ferrule holding portion;
    providing at least one crimp supporting member;
    providing a ferrule having a front end and a rear end, said ferrule including a narrow aperture extending from one end to the other;
    providing a stub fiber having a length dimension shorter than that of said ferrule aperture and a width dimension sufficiently small to permit the stub fiber to be inserted into said ferrule aperture;

inserting said stub fiber into said ferrule aperture such that one end of said stub fiber is generally even with said front end of said ferrule and the other end is within, and not extending beyond, said ferrule aperture;

affixing said stub fiber within said ferrule aperture;

polishing said front end of said ferrule aperture;

inserting said crimp supporting member through said ferrule holding portion and into said crimpable portion of said elongated member;

inserting said ferrule at least partially into said ferrule holding portion of said elongated member;

affixing said ferrule at least partially within said ferrule holding portion of said elongated member so as to retain said crimp supporting member within said crimpable portion of said elongated member;

inserting said elongated member into said housing; and affixing said elongated member within said housing.

11. A method for terminating a multiply layered field optical fiber having a glass fiber core with an optical fiber connector including a housing having opposed first and second ends and a window, an elongated member retainable in said housing and extending generally from one of said opposed ends to the other of said opposed ends, said elongated member including a ferrule holding portion proximate said second end of said housing and a crimpable portion distinct from said ferrule holding portion, said crimpable portion being generally aligned with said ferrule holding portion and being closer to said first end of said housing than is said ferrule holding portion, a ferrule disposable within said ferrule holding portion of said elongated member, said ferrule including an aperture running therethrough and being generally aligned with said crimpable portion when said ferrule is disposed within said ferrule holding portion, said ferrule including a polished front face, at least one crimp supporting member disposed within said crimpable portion of said elongated member, said at least one crimp supporting member defining an elongated path through said crimpable portion, said path being generally aligned with said aperture of said ferrule; and a stub fiber having opposing ends, said stub fiber being disposed within said aperture of said ferrule, one end of said stub fiber being generally even with said polished front face of said ferrule and the opposite end of said stub fiber being disposed within said ferrule, said method comprising the steps of:

providing a crimp tool having opposed crimp dies thereon;

stripping at least one layer from said field optical fiber to expose said glass fiber core;

placing said connector on at least one of said crimp dies of said crimp tool;

lightly closing said opposable crimp dies of said crimp tool over said connector such that at least one of said crimp dies protrudes through said housing window to contact said crimpable portion of said elongated member and simultaneously retain said connector on said crimp tool;

inserting said glass fiber core through said end of said extending member closer said first end of said housing, into and through said elongated path in said crimpable portion of said extending member defined by said crimp supporting member, into said aperture of said ferrule and into contact with said stub fiber disposed within said ferrule aperture; and forcefully closing said opposable crimp dies of said crimp tool over said connector so as to crimp said crimpable portion of said elongated member and thereby retain said field fiber in contact with said stub fiber within said ferrule aperture.

* * * * *

UNITED STATES PATENT AND TRADEMARK OFFICE
CERTIFICATE OF CORRECTION

PATENT NO. : 6,604,867 B2
DATED : August 12, 2003
INVENTOR(S) : Radek et al.

It is certified that error appears in the above-identified patent and that said Letters Patent is hereby corrected as shown below:

Title page,
Item [57], ABSTRACT, replace with the following:

A fiber optic connector for terminating an optical fiber, the connector comprising a housing having opposed first and second ends, an elongated member retainable in the housing, the elongated member including a ferrule holding portion and a crimpable portion distinct from the ferrule holding portion, a ferrule disposable within the ferrule holding portion of the elongated member, the ferrule including an aperture running therethrough, the ferrule including a polished front face, at least one crimp supporting member disposable within the crimpable portion of the elongated member, and a stub fiber having opposing ends, the stub fiber being disposed within the aperture of the ferrule.--

Column 8,
Line 34, "projections" should be -- extending triangular portions --.

Signed and Sealed this

Eighteenth Day of May, 2004

JON W. DUDAS
*Acting Director of the United States Patent and Trademark Office*